United States Patent
Hamaguchi

(10) Patent No.: US 8,317,629 B2
(45) Date of Patent: Nov. 27, 2012

(54) INNER JOINT MEMBER FOR CONSTANT VELOCITY UNIVERSAL JOINT, MANUFACTURING METHOD THEREFOR, AND CONSTANT VELOCITY UNIVERSAL JOINT

(75) Inventor: Hiromitsu Hamaguchi, Nisshin (JP); Yasunori Hamaguchi, legal representative, Nisshin (JP); Yumiko Yokoyama, legal representative, Iwata (JP)

(73) Assignee: NTN Corporation, Osaka (JP)

(*) Notice: Subject to any disclaimer, the term of this patent is extended or adjusted under 35 U.S.C. 154(b) by 204 days.

(21) Appl. No.: 12/864,727

(22) PCT Filed: Jan. 5, 2009

(86) PCT No.: PCT/JP2009/050002
§ 371 (c)(1),
(2), (4) Date: Jul. 27, 2010

(87) PCT Pub. No.: WO2009/096201
PCT Pub. Date: Aug. 6, 2009

(65) Prior Publication Data
US 2011/0118036 A1    May 19, 2011

(30) Foreign Application Priority Data
Feb. 1, 2008  (JP) ................. 2008-023242

(51) Int. Cl.
*F16D 3/224* (2011.01)
(52) U.S. Cl. .......... 464/145; 29/557; 451/52; 464/906
(58) Field of Classification Search .......... 464/144–146, 464/906; 384/49, 625; 29/898.066, 898.13, 29/557, 558; 451/51, 52
See application file for complete search history.

(56) References Cited

U.S. PATENT DOCUMENTS

| 4,973,068 A * | 11/1990 | Lebeck ............. 384/625 X |
| 2002/0077186 A1 | 6/2002 | Hosoya et al. |
| 2008/0146354 A1 | 6/2008 | Une et al. |
| 2010/0130290 A1 | 5/2010 | Yamase |

FOREIGN PATENT DOCUMENTS

| EP | 1 845 274 | 10/2007 |
| JP | 07-310752 | 11/1995 |
| JP | 2002-188653 | 7/2002 |
| JP | 2006-214540 | 8/2006 |
| JP | 2007-232033 | 9/2007 |
| JP | 2008-038960 | 2/2008 |
| WO | 2008/139792 | 11/2008 |

OTHER PUBLICATIONS

International Preliminary Report on Patentability and Written Opinion of the International Searching Authority mailed Sep. 16, 2010 in International (PCT) Application No. PCT/JP2009/050002.

(Continued)

*Primary Examiner* — Gregory Binda
(74) *Attorney, Agent, or Firm* — Wenderoth, Lind & Ponack, L.L.P.

(57) ABSTRACT

An inner joint member for a constant velocity universal joint is incorporated in an outer joint member and has multiple ball track grooves which are formed in an outer diameter surface thereof. A spherical surface roughness in a range extending from an axial center of the outer diameter surface to an end side of the outer diameter surface which corresponds to an opening side of the outer joint member is larger than a spherical surface roughness in a range extending from the axial center of the outer diameter surface to an end side of the outer diameter surface which corresponds to an inner side of the outer joint member.

5 Claims, 3 Drawing Sheets

OTHER PUBLICATIONS

International Search Report issued Mar. 10, 2009 in International (PCT) Application No. PCT/JP2009/050002.

Supplementary European Search Report issued Dec. 13, 2011 in corresponding European Patent Application No. 09706480.2.

* cited by examiner

INNER JOINT MEMBER FOR CONSTANT VELOCITY UNIVERSAL JOINT, MANUFACTURING METHOD THEREFOR, AND CONSTANT VELOCITY UNIVERSAL JOINT

BACKGROUND OF THE INVENTION

I. Technical Field

The present invention relates to an inner joint member for a constant velocity universal joint, and more particularly, to an inner joint member for a constant velocity universal joint of a fixed type, which is used in a power transmission system in an automobile or various industrial machines and in which balls are used as rolling bodies, a manufacturing method therefor, and a constant velocity universal joint provided with the inner joint member.

II. Description of the Related Art

Generally, a constant velocity universal joint is provided with an outer joint member which has track grooves formed on an inner diameter side thereof, an inner joint member which has track grooves formed in an outer diameter side thereof, multiple balls which are interposed between the track grooves of the outer joint member and the track grooves of the inner joint member so as to transmit torque, and a cage which is interposed between the inner diameter surface of the outer joint member and the outer diameter surface of the inner joint member so as to hold the balls.

In the constant velocity universal joint as described above, the inner diameter surface of the outer race as the outer joint member and the outer diameter surface of an inner race as the inner joint member are brought into contact with the cage. Thus, by machining (machining of hardened steel) after a thermal curing process (quenching), the inner diameter surface and the outer diameter surface secure the dimensional accuracy and the surface roughness thereof (JP 2002-188653 A). As described in JP 2002-188653 A mentioned above, in the case of being machined after being quenched, the inner race is finished such that the surface roughness of the outer diameter surface thereof is uniform over the entire region extending from one end side of the outer diameter surface to the other end side thereof.

SUMMARY OF THE INVENTION

However, in the case where the outer diameter surface of the inner race is worked by machining of hardened steel, the machining is generally performed from the end side which corresponds to the inner side of the outer race to the end side which corresponds to the inlet side of the outer race. Therefore, in a range extending from the center of the outer diameter surface of the inner race to the end side which corresponds to the inlet side of the outer race, the surface roughness is reduced in accordance with the abrasion of a tool. In the case where a predetermined value of the surface roughness cannot be satisfied any longer in the range extending from the center of the outer diameter surface to the end side which corresponds to the inlet side of the outer race, the life of the tool comes to an end at the time point. In particular, when the tool is expensive, the life of the tool has a large influence on the manufacturing cost. Therefore, the extension of the life of the tool is demanded.

In view of the above-mentioned circumstances, the present invention provides an inner joint member for a constant velocity universal joint, which is capable of extending a life of a cutting tool and achieving reduction in manufacturing cost, a manufacturing method therefor, and a constant velocity universal joint provided with the inner joint member.

In an inner joint member for a constant velocity universal joint according to the present invention, which is incorporated in an outer joint member and has multiple ball track grooves formed in an outer diameter surface thereof, a spherical surface roughness in a range extending from an axial center of the outer diameter surface to an end side of the outer diameter surface which corresponds to an inner side of the outer joint member is different from a spherical surface roughness in a range extending from the axial center of the outer diameter surface to an end side of the outer diameter surface which corresponds to an opening side of the outer joint member.

According to the inner joint member for a constant velocity universal joint of the present invention, the spherical surface roughness in the range extending from the axial center of the outer diameter surface to the end side which of the outer diameter surface corresponds to the inner side of the outer joint member is different from that in the range therefrom the end side of the outer diameter surface which corresponds to the opening side, whereby any one of them can be roughly finished. In this manner, the finishing which is performed with use of the cutting tool in the rough range can be roughly completed. That is, the criteria of the life of the tool can be relaxed in the rough range.

It is preferable that the spherical surface roughness in the range extending from the axial center of the outer diameter surface to the end side of the outer diameter surface which corresponds to the opening side of the outer joint member be larger than the spherical surface roughness in the range extending from the axial center of the outer diameter surface to the end side of the outer diameter surface which corresponds to the inner side of the outer joint member. This is because, the track grooves of the outer joint member open on the inlet side (opening side), and hence the influence on the function of the constant velocity universal joint is small even when the spherical surface roughness in the range extending from the axial center to the end side which corresponds to the opening side of the outer joint member is large in the outer diameter surface of the inner joint member.

It is possible to establish R2<R1<2×R2 when the spherical surface roughness in the range extending from the axial center of the outer diameter surface to the end side of the outer diameter surface which corresponds to the opening side of the outer joint member is R1, and the spherical surface roughness in the range extending from the axial center of the outer diameter surface to the end side of the outer diameter surface which corresponds to the inner side of the outer joint member is R2. It is also possible to set the spherical surface roughness in the range extending from the axial center of the outer diameter surface to the end side of the outer diameter surface which corresponds to the inner side of the outer joint member to be equal to or smaller than Ra: 0.8.

In a method of manufacturing an inner joint member for a constant velocity universal joint according to the present invention, which is incorporated in an outer joint member and has multiple ball track grooves formed in an outer diameter surface thereof, a cutting tool is moved from an end side of the outer diameter surface, which corresponds to an inner side of the outer joint member, to an end side thereof which corresponds to an opening side of the outer joint member so as to machine the outer diameter surface, and a spherical surface roughness in a range extending from an axial center of the outer diameter surface to the end side of the outer diameter surface which corresponds to the opening side of the outer joint member is larger than a spherical surface roughness in a range extending from the axial center of the outer diameter surface to the end side of the outer diameter surface which corresponds to the inner side of the outer joint member.

The spherical surface roughness in the range extending from the axial center of the outer diameter surface to the end side which of the outer diameter surface corresponds to the opening side of the outer joint member is large. Thus, the criteria of the life of the tool can be relaxed in the rough range.

The constant velocity universal joint according to the present invention includes:

an outer joint member which has multiple ball track grooves formed in an inner diameter surface thereof;

an inner joint member which has multiple ball track grooves formed in an outer diameter surface thereof;

multiple balls which are interposed between the ball track grooves of the outer joint member and the ball track grooves of the inner joint member, for transmitting torque; and a cage which is interposed between the inner diameter surface of the outer joint member and the outer diameter surface of the inner joint member, for holding the balls, in which a spherical surface roughness in a range extending from an axial center of the outer diameter surface of the inner joint member to an end side of the outer diameter surface which corresponds to an opening side of the outer joint member is larger than a spherical surface roughness in a range extending from the axial center of the outer diameter surface to an end side of the outer diameter surface which corresponds to an inside of the outer joint member.

The spherical surface roughness in the range extending from the axial center of the outer diameter surface of the inner joint member to the end side which of the outer diameter surface corresponds to the opening side of the outer joint member is large. Thus, the criteria of the life of the tool can be relaxed in the rough range.

In the inner joint member for a constant velocity universal joint according to the present invention, the finishing which is performed with use of the cutting tool in the rough range can be roughly completed. Thus, the criteria of the life of the tool can be relaxed in the rough range, and hence the life of the cutting tool can be extended, which leads to reduction in manufacturing cost.

Further, the track grooves of the outer joint member open on the inlet side (opening side), and hence the influence on the function of the constant velocity universal joint is small even when the spherical surface roughness in the range extending from the axial center of the outer diameter surface of the inner joint member to the end side of the outer diameter surface which corresponds to the inlet side (opening side) thereof is large. Therefore, it is preferable that the spherical surface roughness in the range extending from the axial center to the end side which corresponds to the opening side of the outer joint member be large in the outer diameter surface of the inner joint member.

In particular, when the spherical surface roughness in the range extending from the axial center of the outer diameter surface of the inner joint member to the end side of the outer diameter surface which corresponds to the opening side of the outer joint member is R1, and the spherical surface roughness in the range extending from the axial center of the outer diameter surface to the end side of the outer diameter surface which corresponds to the inner side of the outer joint member is R2, R2<R1<2×R2 is established. As a result, the life of the tool can be largely extended.

Further, when the spherical surface roughness in the range extending from the axial center of the outer diameter surface of the inner joint member to the end side of the outer diameter surface which corresponds to the inner side of the outer joint member is set to be equal to or smaller than Ra: 0.8, the influence on the function of the constant velocity universal joint can be extremely reduced.

DETAILED DESCRIPTION OF THE INVENTION

An embodiment of an inner joint member for a constant velocity universal joint according to the present invention is described with reference to FIGS. 1 and 2.

Figure 2:
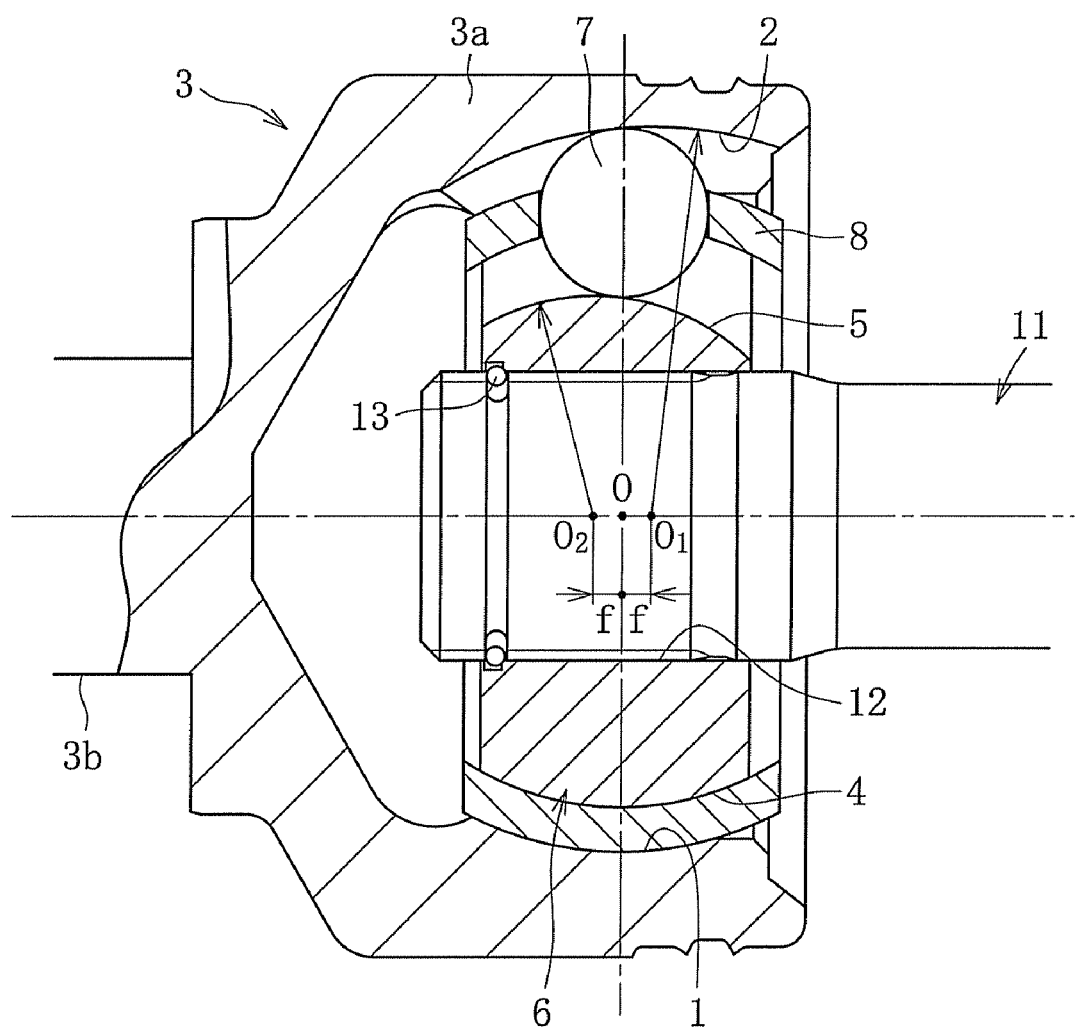
FIG. 2 is a sectional view of a constant velocity universal joint in which the inner joint member for a constant velocity universal joint is used.

FIG. 2 illustrates a constant velocity universal joint using the inner joint member for a constant velocity universal joint according to the present invention. The constant velocity universal joint includes an outer race 3 as an outer joint member which has ball track grooves 2 (hereinafter, sometimes simply referred to as track grooves 2) formed in an inner diameter surface 1, an inner race 6 as an inner joint member which has ball track grooves 5 (hereinafter, sometimes simply referred to as track grooves 5) formed in an outer diameter surface 4, multiple balls 7 which are interposed between the track grooves 2 of the outer race 3 and the track grooves 5 of the inner race 6 so as to transmit torque, and a cage 8 which is interposed between the inner diameter surface 1 of the outer race 3 and the outer diameter surface 4 of the inner race 6 so as to hold the balls 7. Note that, the outer race 3 is constituted by a bowl-shape mouth portion 3a having the track grooves 2 and a stem portion 3b protruding from the bottom portion of the mouth portion 3a.

A shaft 11 is inserted into a central hole (inner diameter hole) 12 of the inner race 6 so as to provide spline engagement therebetween, and the spline engagement enables torque transmission therebetween. The shaft 11 is retained with respect to the inner race 6 by a stopper ring 13.

A center curvature O1 of the track grooves 2 of the outer race 3 is set by being shifted in the axial direction from a joint center O to the opening side of the outer race 3. A center curvature O2 of the track grooves 5 of the inner race 6 is set by being separated in the axial direction from the joint center O by an equal distant f to the inner side which is opposite to the center curvature O1 of the track grooves 2 of the outer race 3.

The outer diameter surface 4 of the inner race 6 is a machined surface obtained after quenching. That is, in the case where the inner race 6 is made of steel material such as medium carbon steel, the outer diameter surface 4 and the track grooves 5 are machined after a thermal curing process (high-frequency quenching, for example). Herein, the high-frequency quenching represents quenching in which a curing process-subjected member is put between coils which carry high-frequency current so that the surface thereof is heated with Joule heat which is generated by eddy current in the surface thereof.

Figure 1:
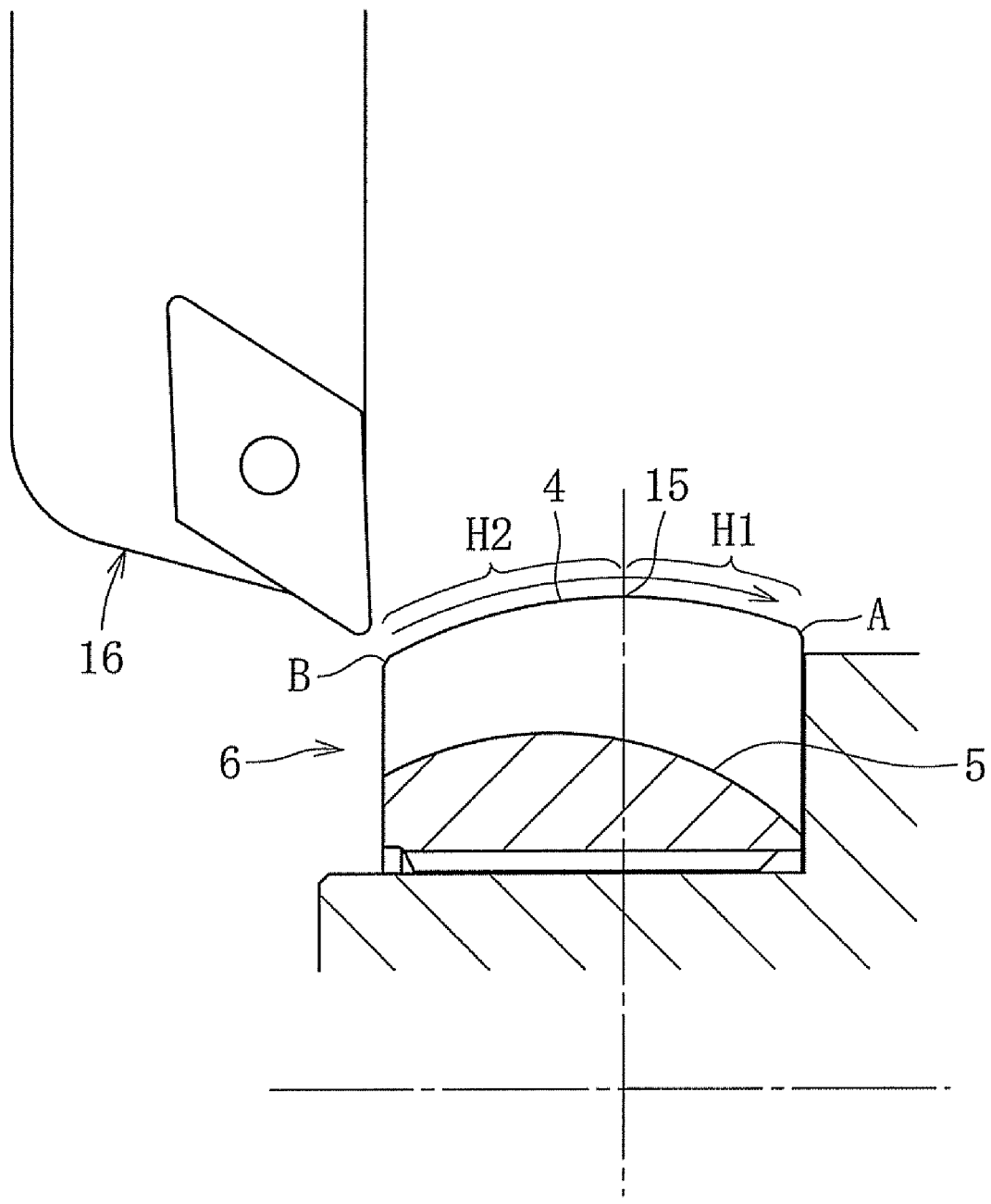
FIG. 1 is a sectional view of a main part of an inner joint member for a constant velocity universal joint according to an embodiment of the present invention.

In this case, as illustrated in FIG. 1, the outer diameter surface 4 of the inner race 6 is divided in a range H1 extending from an axial center 15 to an end A which corresponds to an opening side of the outer race 3 (hereinafter, sometimes simply referred to as end A corresponding to opening side), and in a range H2 extending from the axial center 15 to an end B which corresponds to an inner side of the outer race 3 (hereinafter, sometimes simply referred to as end B corresponding to inner side). The spherical surface roughnesses in H1 and H2 are different from each other. In this embodiment, the spherical surface roughness in the range H1 is larger than the spherical surface roughness in the range H2. Specifically, when the surface roughness in the range H1 is R1 and the surface roughness in the range H2 is R2, R2<R1<2×R2 is established. Further, the surface roughness R2 in the range H2 is equal to or smaller than Ra: 0.8.

Herein, the surface roughness represents center-line average roughness, which is obtained by folding back a roughness curve with reference to the center line and by representing a value which is obtained by dividing a value of the area by a measurement length with micrometer (μm), the area being defined by the roughness curve and the center line.

Incidentally, as illustrated in FIG. 1, the machining (grinding) of the outer diameter surface 4 of the inner race 6 is performed by moving, as indicated by an arrow, the blade of a tool 16 from the end B side which corresponds to the inner side of the outer diameter surface 4 to the end A side which corresponds to the opening side thereof. In this case, the surface roughness in the range H1 extending from the axial center 15 to the end A side may be larger than the surface roughness in the range H2 extending from the axial center 15 to the end B side. As a result, the finishing which is performed with use of the cutting tool in the range H1 can be roughly completed.

In the present invention, in the range H1 extending from the axial center 15 to the end A side which corresponds to the opening side, the finishing which is performed with use of the cutting tool can be roughly completed. Therefore, the abrasion of the cutting tool can be reduced. In this manner, the life of the cutting tool can be extended, which leads to reduction in manufacturing cost.

Note that, conversely to the above-mentioned embodiment, the spherical surface roughness in the range H2 extending from the axial center 15 to the end B side which corresponds to the inner side may be larger than the spherical surface roughness in the range H1 extending from the axial center 15 to the end A side which corresponds to the opening side. However, the track grooves 2 of the outer race 3 open on the inlet side (opening side), and hence the influence on the function of the constant velocity universal joint is reduced in the case where the spherical surface roughness in the range H1 extending from the axial center 15 to the end A side which corresponds to the opening side is made larger than the spherical surface roughness in the range H2 extending from the axial center 15 to the end B side which corresponds to the inner side. For this reason, as in the embodiment illustrated in FIG. 1, it is preferable that the spherical surface roughness in the range H1 extending from the axial center 15 to the end A side be larger (than the spherical surface roughness in the range H2).

Specifically, when the spherical surface roughness in the range extending from the axial center 15 of the outer diameter surface 4 to the end A side which corresponds to the opening side is R1, and the spherical surface roughness in the range extending from the axial center 15 of the outer diameter surface 4 to the end B side which corresponds to the inner side is R2, R2<R1<2×R2 is established. As a result, the life of the tool can be largely extended. Further, when the spherical surface roughness in the range extending from the axial center 15 of the outer diameter surface 4 to the end B side which corresponds to the inner side is equal to or smaller than Ra: 0.8, the influence on the function of the constant velocity universal joint can be extremely reduced. Note that, when the spherical surface roughness in the range extending from the axial center 15 of the outer diameter surface 4 to the end B side which corresponds to the inner side exceeds Ra: 0.8, the surface is excessively rough. Thus, there is a fear that it is impossible to smoothly form an operational angle in the case where the constant velocity universal joint is constituted with use of the inner race 6.

As described above, the embodiment of the present invention is described. In this context, the present invention is not limited to the above-mentioned embodiment, and various modifications can be made thereto. For example, while the constant velocity universal joint of a Barfield type (BJ) is illustrated in FIG. 2, constant velocity universal joints of other types such as an undercut-free type (UJ) may be used. Further, the number of the balls 7 can be arbitrarily set. Specifically, while being able to be set within the range of three to eight, the number of the ball 7 is not limited thereto. Further, a curing process expect the high-frequency quenching, such as carburizing and quenching, or nitriding may be adopted.

Incidentally, the track grooves 5 of the inner race 6 are also subjected to machining after quenching (machining of hardened steel). Similarly to the outer diameter surface 4, it is preferable that the roughness of each of the track grooves 5 be equal to or smaller than Ra: 0.8.

Figure 3:
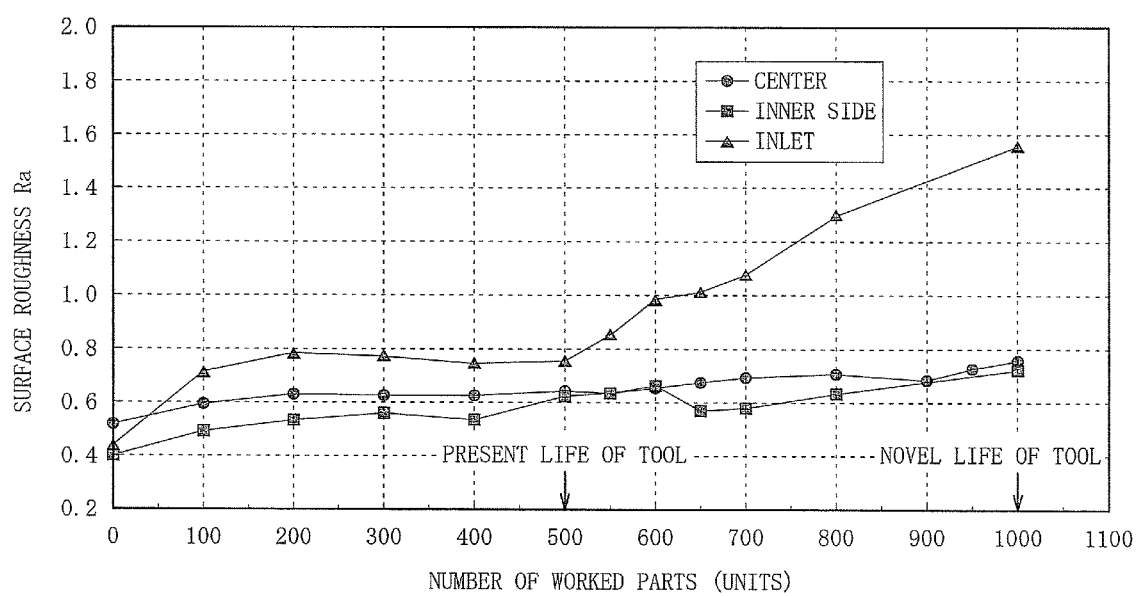
FIG. 3 is a graph diagram showing a relation between a surface roughness and a life of a cutting tool.

FIG. 3 shows a relation between the number of worked parts which can be worked with use of one cutting tool and the surface roughness. In the case where the surface roughness is uniform over the entire region of the outer diameter surface 4 of the inner race 6, when the number of worked parts exceeds approximately five hundred, the surface roughness on the end A side (refer to FIG. 1) which corresponds to the opening side of the outer diameter surface 4 is larger. At the time point when the roughness on the end A side which corresponds to the opening side cannot be secured equally to the surface roughness on the end B side corresponding to the inner side and at the axial center any longer as described above, the life of the tool comes to an end. However, as in the present invention, in the case where the surface roughness on the end A side which corresponds to the opening side may be larger than the surface roughness on the end side B which corresponds to the inner side, the life of the tool can be extended so as to increase the number of working to approximately one thousand. Note that, in FIG. 3. ● denotes a surface roughness at the axial center 15, ■ denotes a surface roughness on the end B side which corresponds to the inner side, and ▲ denotes a surface roughness on the end A side which corresponds to the inlet side (opening side).

The invention claimed is:

1. An inner joint member for a constant velocity universal joint, which is for incorporation in an outer joint member, said inner joint member comprising:
   an outer diameter surface with multiple ball track grooves, wherein the outer diameter surface has a spherical surface roughness in a range extending from an axial center of the outer diameter surface to an end side of the outer diameter surface which corresponds to an opening side of the outer joint member that is larger than a spherical surface roughness in a range extending from the axial center of the outer diameter surface to an end side of the outer diameter surface which corresponds to an inner side of the outer joint member.

2. The inner joint member for a constant velocity universal joint according to claim 1, wherein, when the spherical surface roughness in the range extending from the axial center of the outer diameter surface to the end side of the outer diameter surface which corresponds to the opening side of the outer joint member is R1, and the spherical surface roughness in the range extending from the axial center of the outer diameter surface to the end side of the outer diameter surface which corresponds to the inner side of the outer joint member is R2, R2<R1<2×R2 is established.

3. The inner joint member for a constant velocity universal joint according to claim 2, wherein the spherical surface roughness in the range extending from the axial center of the outer diameter surface to the end side of the outer diameter surface which corresponds to the inner side of the outer joint member is equal to or smaller than Ra: 0.8 μm.

4. A method of manufacturing an inner joint member for a constant velocity universal joint, which is for incorporation in an outer joint member, said method comprising:
   forming multiple ball track grooves in an outer diameter surface of the inner joint member,
   wherein a cutting tool is moved from an end side of the outer diameter surface, which corresponds to an inner side of the outer joint member, to an end side thereof which corresponds to an opening side of the outer joint member so as to machine the outer diameter surface, and a spherical surface roughness in a range extending from an axial center of the outer diameter surface to the end side of the outer diameter surface which corresponds to the opening side of the outer joint member is larger than a spherical surface roughness in a range extending from the axial center of the outer diameter surface to the end side of the outer diameter surface which corresponds to the inner side of the outer joint member.

5. A constant velocity universal joint, comprising:
   an outer joint member having multiple ball track grooves disposed in an inner diameter surface thereof;
   an inner joint member having multiple ball track grooves disposed in an outer diameter surface thereof;
   multiple balls which are interposed between the ball track grooves of the outer joint member and the ball track grooves of the inner joint member, for transmitting torque; and
   a cage which is interposed between the inner diameter surface of the outer joint member and the outer diameter surface of the inner joint member, for holding the balls,
   wherein the outer diameter surface has a spherical surface roughness in a range extending from an axial center of the outer diameter surface of the inner joint member to an end side which of the outer diameter surface corresponds to an opening side of the outer joint member that is larger than a spherical surface roughness in a range extending from the axial center of the outer diameter surface to an end side of the outer diameter surface which corresponds to an inside of the outer joint member.

* * * * *